UNITED STATES PATENT OFFICE.

ISRAEL D. DAVIS, OF STOCKTON, CALIFORNIA.

TONIC.

SPECIFICATION forming part of Letters Patent No. 351,829, dated November 2, 1886.

Application filed February 10, 1886. Serial No. 191,445. (No specimens.)

*To all whom it may concern:*

Be it known that I, ISRAEL D. DAVIS, a citizen of the United States, residing at Stockton, in the county of San Joaquin, State of California, have invented certain new and useful Improvements in Medical Compounds as an Invigorator, of which the following is a specification.

The said medical compound consists of the following ingredients combined in the proportions stated, viz: pure water, twenty gallons; root of the mandrake, (*Podophyllum peltatum,*) one-half pound; twigs and leaves of the spruce pine, (*Pinus Lambertiana,*) five pounds; twigs and leaves of wormwood, (*Artemisia absinthium,*) one pound; root of the dew-berry, (*Rubus trivialis,*) one pound; pine gum, (*Pinus Lambertiana,*) one pound; leaves of the wild peach, (*Eridictyon glutinosum,*) one pound; poke-root, (*Phytolacca deccandra,*) one-half pound; prickly-ash bark, (*Xanthoxylum fraxineum,*) one-half pound.

The solid ingredients are first steeped in and their strength extracted by boiling in the quantity of water above mentioned. The liquid solution thus obtained is then filtered and clarified and permitted to cool. It is then bottled for sale and use, the corks of the vials and bottles being hermetically sealed. The wild peach is indigenous to California, and is very efficacious in cases of rheumatism.

This compound is used in accordance with the following directions, to wit: For adults, a wine-glassful three times a day an hour before eating; for children, one half the above quantity to be taken. If the effect be griping, or the evacuation of the bowels be too severe, moderate the dose. By this treatment the system is cleansed and invigorated, and the use of the compound is highly beneficial in rheumatism, scrofula, and all skin diseases. It is also very beneficial in cases of diseases in the urinary organs and kidneys; also in cases of bronchitis, falling of the womb, piles, &c.

What I claim, and desire to secure by Letters Patent of the United States, is—

The herein described medical compound as an invigorator, consisting of pure water, mandrake-root, spruce-pine leaves and twigs, dew-berry root, pine gum, wild-peach leaves, poke-root, wormwood leaves and twigs, and prickly-ash bark, in the proportions specified.

In testimony whereof I affix my signature in presence of two witnesses.

ISRAEL D. DAVIS.

Witnesses:
ELIHU B. STOWE,
JOSHUA B. WEBSTER.